No. 739,468. PATENTED SEPT. 22, 1903.
G. A. WEBER.
STEP JOINT.
APPLICATION FILED APR. 25, 1903.
NO MODEL. 6 SHEETS—SHEET 1.
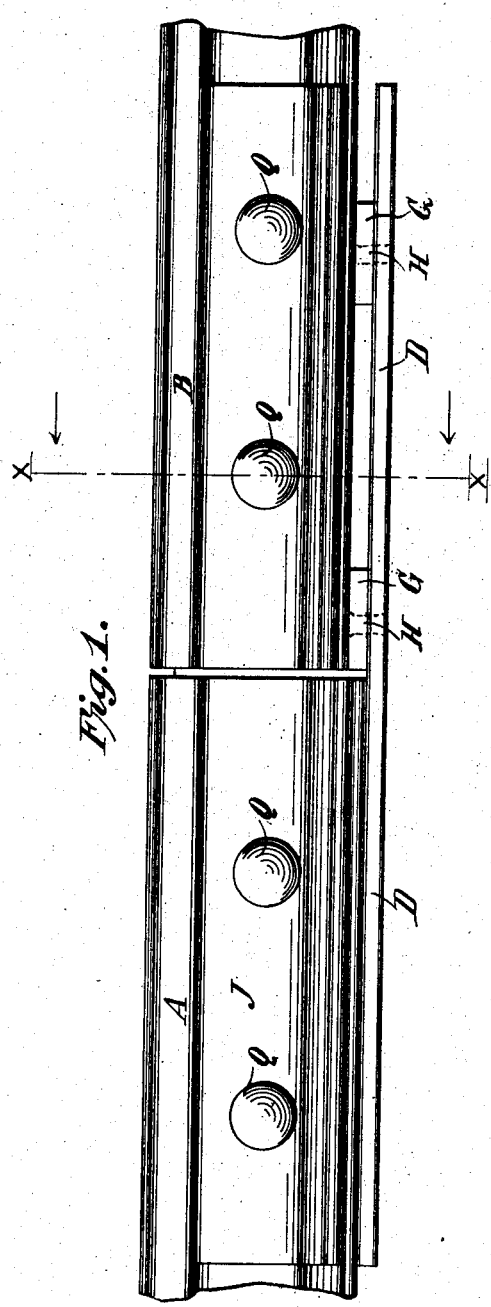
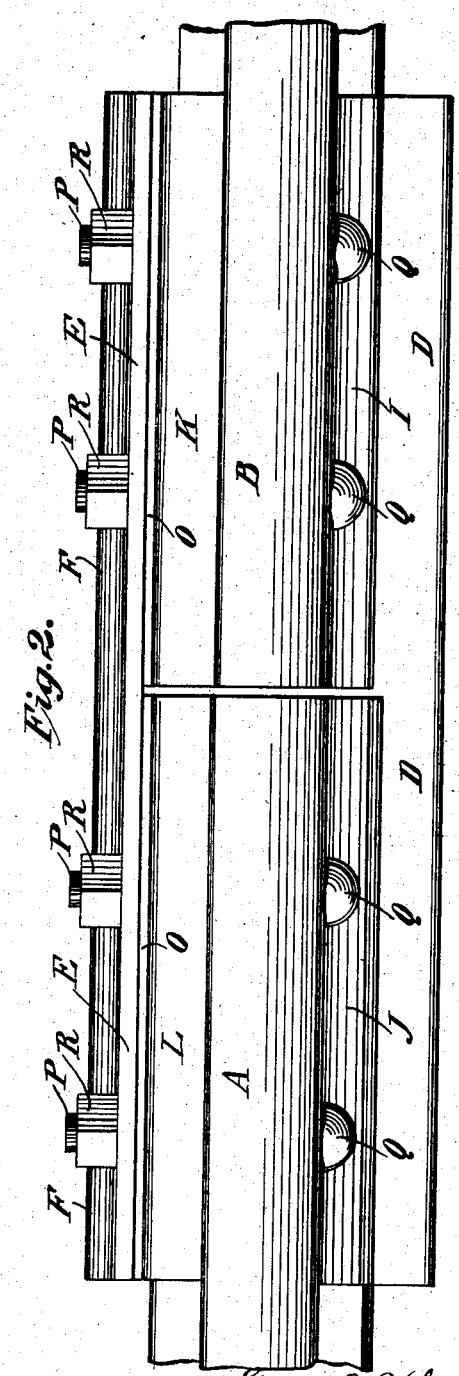

No. 739,468. PATENTED SEPT. 22, 1903.
G. A. WEBER.
STEP JOINT.
APPLICATION FILED APR. 25, 1903.
NO MODEL. 6 SHEETS—SHEET 2.
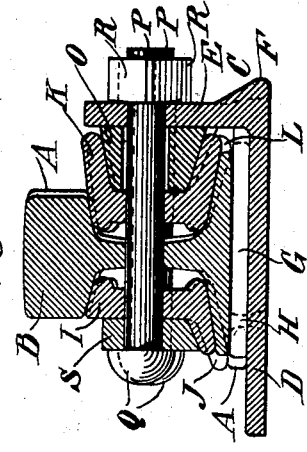
Fig. 6.
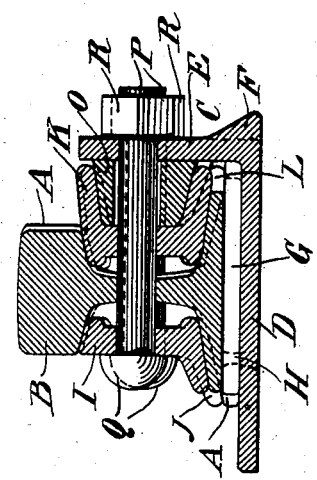
Fig. 5.
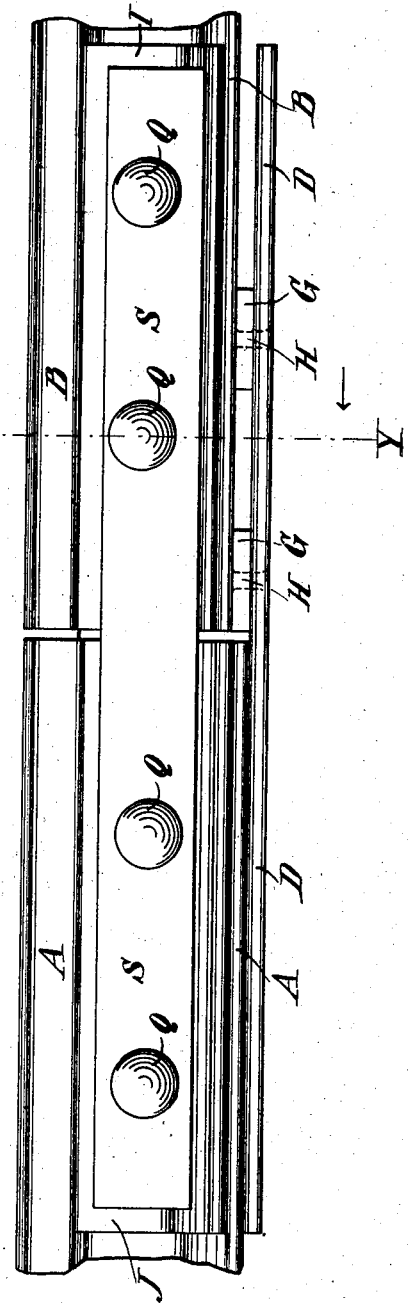
Fig. A.
Witnesses
K. Mitchell
A. L. O'Brien
George A. Weber
Inventor
By Dickerson Brown
Raegener & Binney
Attys No. 739,468. PATENTED SEPT. 22, 1903.
G. A. WEBER.
STEP JOINT.
APPLICATION FILED APR. 25, 1903.
NO MODEL. 6 SHEETS—SHEET 3.
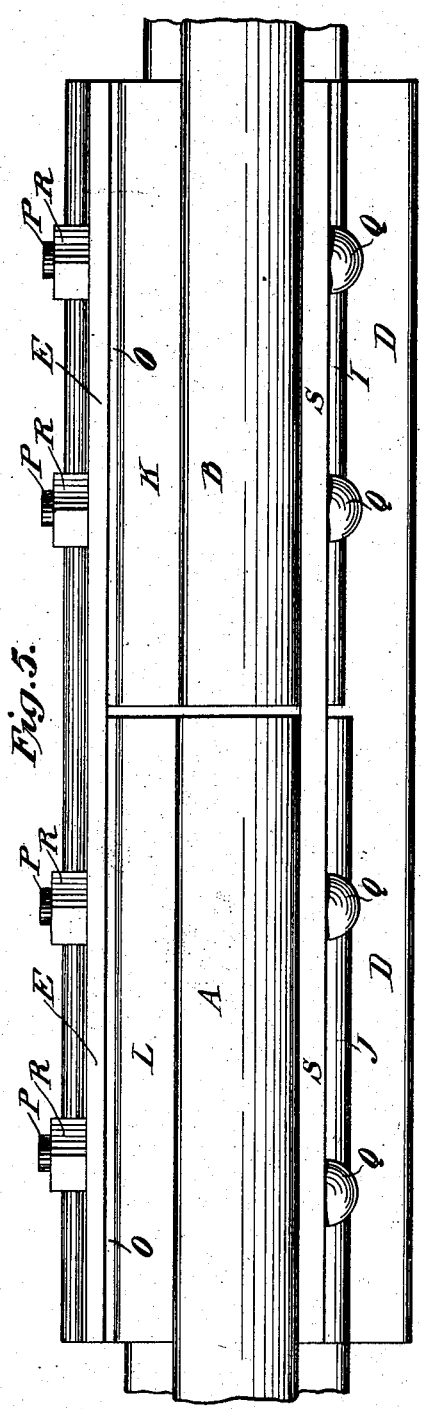
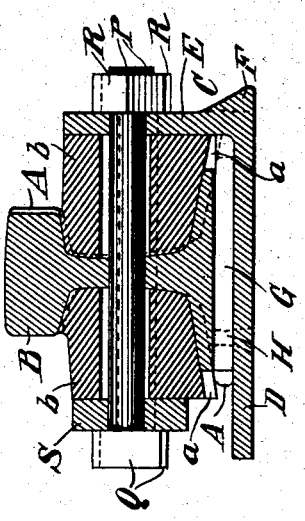
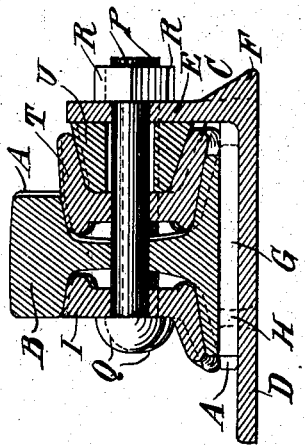
George A. Weber
Inventor No. 739,468. PATENTED SEPT. 22, 1903.
G. A. WEBER.
STEP JOINT.
APPLICATION FILED APR. 25, 1903.
NO MODEL. 6 SHEETS—SHEET 4.
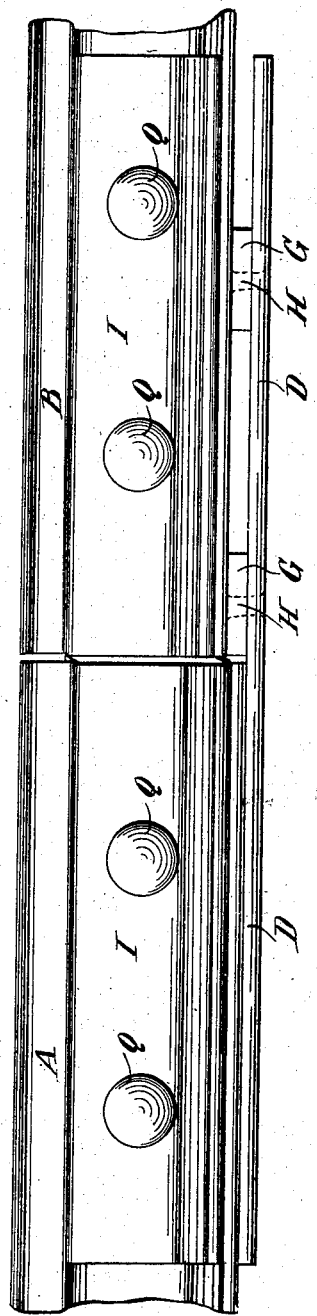
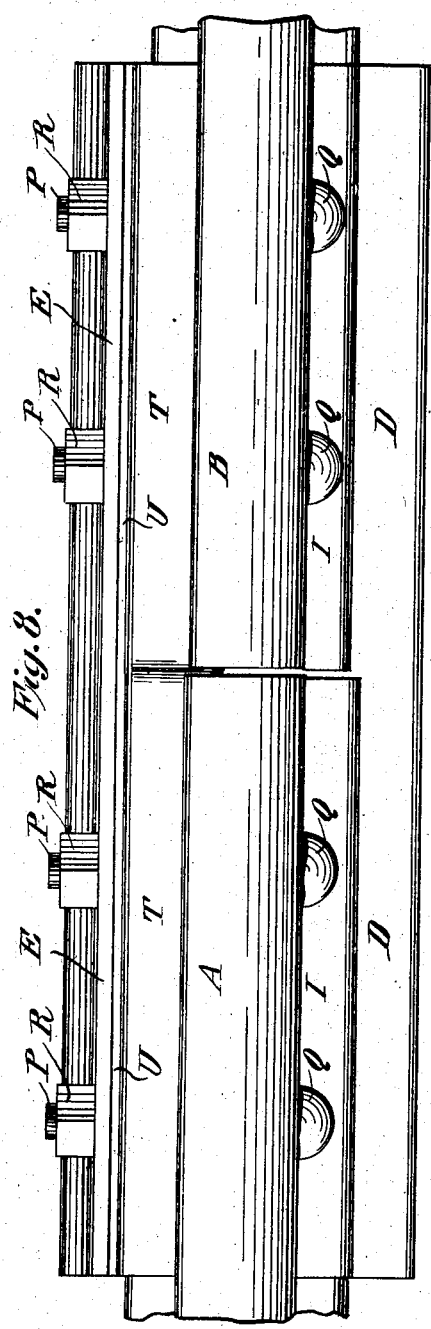

No. 739,468. PATENTED SEPT. 22, 1903.
G. A. WEBER.
STEP JOINT.
APPLICATION FILED APR. 25, 1903.
NO MODEL. 6 SHEETS—SHEET 5.
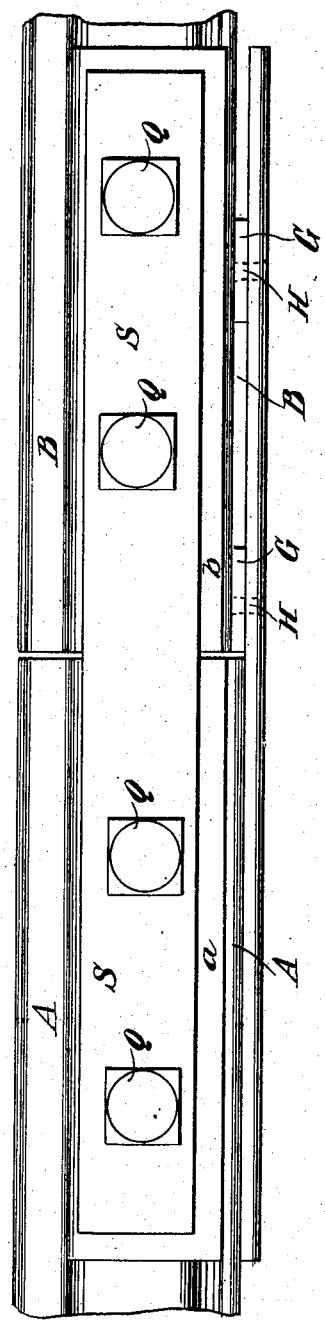
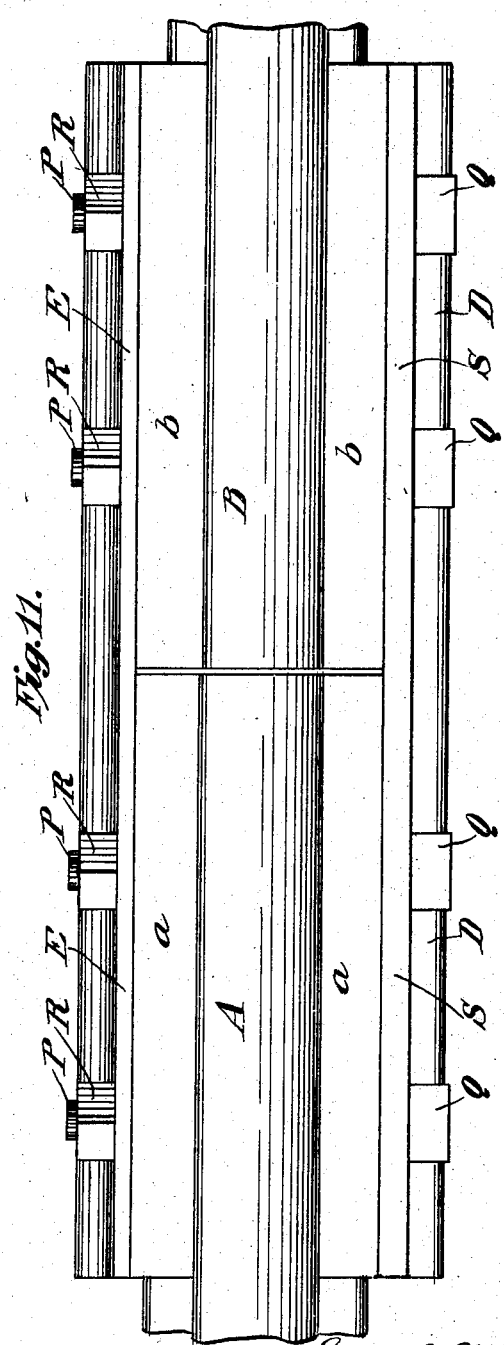

No. 739,468. PATENTED SEPT. 22, 1903.
G. A. WEBER.
STEP JOINT.
APPLICATION FILED APR. 25, 1903.
NO MODEL. 6 SHEETS—SHEET 6.
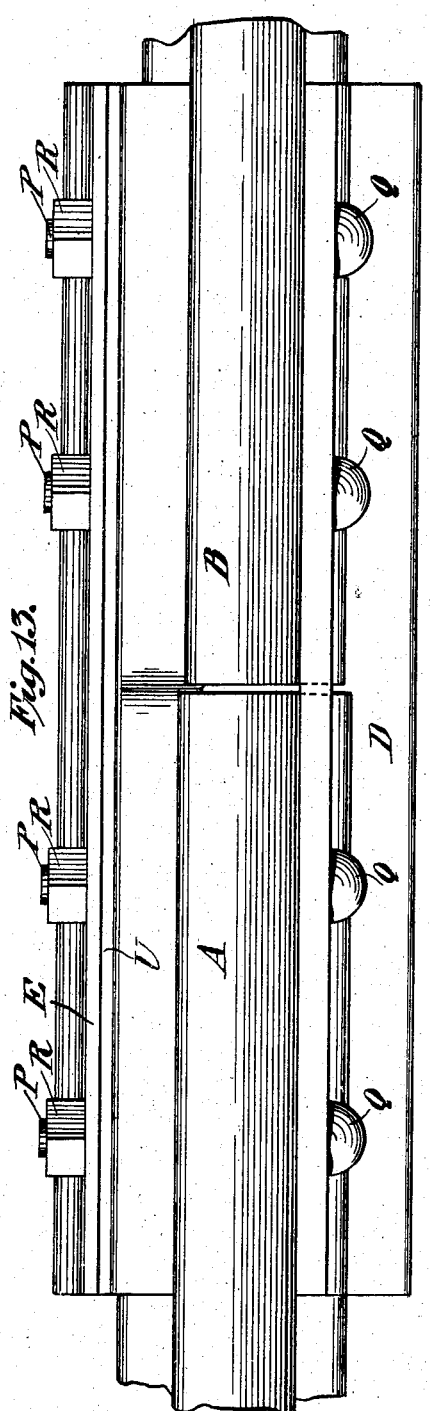
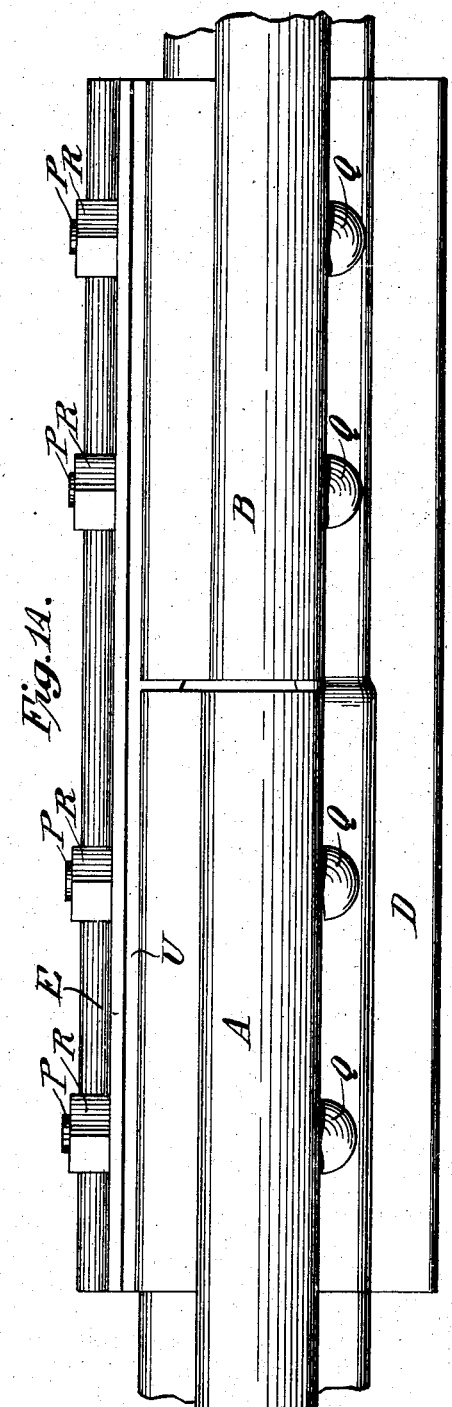

No. 739,468. Patented September 22, 1903.

UNITED STATES PATENT OFFICE.

GEORGE A. WEBER, OF NEW YORK, N. Y., ASSIGNOR TO THE WEBER RAILWAY JOINT MANUFACTURING COMPANY, OF NEW YORK, N. Y., A CORPORATION OF WEST VIRGINIA.

STEP-JOINT.

SPECIFICATION forming part of Letters Patent No. 739,468, dated September 22, 1903.

Application filed April 25, 1903. Serial No. 154,220. (No model.)

*To all whom it may concern:*

Be it known that I, GEORGE A. WEBER, a citizen of the United States, and a resident of the borough of Manhattan, city, county, and State of New York, have invented certain new and useful Improvements in Step-Joints, of which the following is a specification, accompanied by drawings.

The invention relates to railroad-rail joints, but more particularly to that class known as "step-joints;" and the objects of the invention are to improve upon the construction of such joints and increase their efficiency and strength, while at the same time simplifying their construction.

Further objects of the invention will hereinafter appear; and to these ends the invention consists of the apparatus embodying the features of construction, combinations of elements, and arrangement of parts, substantially as hereinafter fully described and claimed in this specification and shown in the accompanying drawings, in which—

Figure 1 is a side elevation of the rail-joint embodying the invention. Fig. 2 is a plan view of Fig. 1. Fig. 3 is a transverse sectional view of the same on the line X X of Fig. 1. Fig. 4 is a side elevation of a modified form of joint embodying the invention. Fig. 5 is a plan view of Fig. 4. Fig. 6 is a transverse sectional view of the modification on the line Y Y of Fig. 4. Fig. 7 is a side elevation of a joint embodying another form of the invention. Fig. 8 is a plan view of the same. Fig. 9 is a transverse sectional view of the same. Fig. 10 is a side elevation of another modification. Fig. 11 is a plan view of the same, and Fig. 12 is a transverse sectional view of the same. Figs. 13 and 14 are plan views of modifications.

The rails A and B, as shown, are of different weights and heights, and the head and web portions of the rail A, as shown, are thicker than are the head and web portions of the rail B. The joints hereinafter to be described are designed to maintain the rails A and B of different weight in surface and alinement upon a suitable rail-support, shown in this instance as an angle-chair C, comprising a base D and an upright E. The angle-chair is also provided with the longitudinally-extending strengthening - fillet or spiking-rib F.

The invention is not to be understood as limited to rail-chairs of the form described; but, as shown, the chair C suitably illustrates the invention.

The taller rail A, as shown in the drawings, rests upon a portion of the base D of the chair C, while the rail B, of lesser height, is blocked up by suitable means, shown in this instance as the transversely-extending cleats G. There may be any desired number of the cleats G, as shown, there being two in this instance, and they may be secured to the base D of the chair by suitable means, shown as the rivets H. The rivets H are arranged at the outer ends of the cleats, for the inner ends bear against the lower portions of the upright E of the angle-chair and prevent movement and derangement of the cleats under vibration. The cleats G are of the desired thickness for supporting the rail B in surface with the rail A.

In Fig. 1 angle bars or plates I J and channel bars or plates K L are arranged at each side of the webs of the rails to maintain the rails in surface and alinement. As shown, the angle and channel plates do not extend continuously across the joint, but are formed in separate sections. The sections I J and K L of the angle and channel plates are constructed to fit between the bases and heads of the rails, as shown, the channel-plates K and L being arranged between the webs of the rails and the upright E of the angle-chair. Suitable packing-blocks O, in this instance of wood, are arranged between the channel-plates and the upright of the chair. The angle-plates I and J extend along the webs of the rails on the inside of the joint, and bolts P, provided with heads Q and nuts R, are adapted to secure the parts of the joint together. The wooden filling-blocks O may consist, as shown, of a plurality of pieces, or else one continuous block may extend across the joint within the channel-plates K and L.

According to the construction described it will be seen that the angle and channel plates do not have to be offset either vertically or horizontally, and the construction is cheap and simple, while at the same time strong and efficient.

In Figs. 4, 5, and 6 the joint, like the joint in Figs. 2 and 3, is shown with the addition of a solid strap S, which may be of metal, arranged on the inside of the joint and extending across the joint along the angle-plates I and J. The bolts P pass through the strap or bar S, as shown, the heads of the bolts in this instance resting upon said bar. According to this construction the member S opposes the upright or member E, and when the joint is tightened up by tightening the bolts R a strong and efficient construction is obtained.

The modification shown in Figs. 7, 8, and 9 differs from the joint shown in Figs. 1, 2, and 3 by reason of the fact that a solid channel-plate T is provided, which extends across the joint adjacent the webs of the rails between the rails and the upright E of the angle-chair. In order to compensate for differences in the height and thickness of the rails, the angle-plate T is offset both vertically and laterally, as shown, and a wooden filling-block U is arranged between the angle-plate T and the upright of the chair.

In Figs. 10, 11, and 12 wooden filling-blocks $a\ b$ are arranged each side of the joint, while a solid strap or bar S extends along the inside of the joint and opposes the upright E of the angle-chair. The wooden filling-blocks $a\ b$ are broken, as shown, and adapted to fit between the heads and bases of the rails. A strong and efficient joint is obtained when the nuts R of the bolts are tightened up, thereby clamping the filling-blocks between the opposing member S and the upright E of the angle-chair.

Fig. 13 shows a joint in which the channel-plate is solid and extends across the joint. The angle-plate is formed in two parts, and a continuous strap is arranged along the sectional angles.

In Fig. 14 the channel-plate is formed in two parts, while the angle-plate is solid, and no strap is provided. Both these latter forms afford strong and efficient constructions which are cheap and easy to make and securely hold the ends of the rails of different size and weight.

I understand that it is not proper to claim, specifically, in this application, together with the claims already herein contained, a rail-joint, as specified, embodying two wooden filling-blocks at each side of the webs of the rails, with a strap or band extending across the joint outside of the filling-blocks, nor is it proper to claim, specifically, a sectional channel-plate and a solid angle-plate in combination with the other parts of the joint, since these claims would be alternative to those already in the case, and therefore proper subject-matter for a division.

I do not herein claim anything shown, described, and claimed in my copending application, Serial No. 142,730, filed February 10, 1903, for improvements in rail-joints.

Obviously some features of my invention may be used without others, and my invention may be embodied in widely-varying forms.

Therefore, without limiting myself to the construction shown and described or enumerating equivalents, I claim, and desire to obtain by Letters Patent, the following:

1. A rail-joint comprising an angle-chair having a base and an upright, rails of different weight and height supported in surface upon said chair, sectional angle-plates and channel-plates arranged at each side of the webs of the rails, said angle and channel plates being constructed to maintain the rails in surface and alinement, a filling-block arranged between the angle-plates and the upright of the chair, and bolts for securing the parts of the joint together, for substantially the purposes set forth.

2. A rail-joint comprising an angle-chair having a base and an upright, rails of different weight and height supported in surface upon said chair, two angle-plates at one side of the joint extending along the webs of the rails, two channel-plates at the other side of the joint extending along the webs of the rails between the rails and the upright of the angle-chair, said plates being constructed to maintain the rails in surface and alinement, a filling-block between the channel-plates and the upright of the chair, and bolts for securing the parts of the joint together, for substantially the purposes set forth.

3. A rail-joint comprising an angle-chair having a base and an upright, rails of different weight and height supported in surface upon said chair, two angle-plates at one side of the joint extending along the webs of the rails, two channel-plates at the other side of the joint extending along the webs of the rails between the rails and the upright of the angle-chair, said plates being constructed to maintain the rails in surface and alinement, a filling-block between the channel-plates and the upright of the chair, a strap or band extending across the joint outside of the angle-plates and opposing the upright of the angle-chair, and bolts for securing the parts of the joint together, for substantially the purposes set forth.

4. A rail-joint, comprising an angle-chair having a base and an upright, rails of different weight and height supported in surface upon said chair, a channel-plate and an angle-plate arranged on opposite sides of the webs of the rails, one of said plates being sectional, and both of said plates being constructed to maintain the rails in surface and alinement, a filling-block arranged within the upright of the chair, and bolts for securing the parts of the joint together, for substantially the purposes set forth.

5. A rail-joint, comprising an angle-chair, having a base and an upright, rails of different weight and height supported in surface upon said chair, a channel-plate and an angle-plate arranged on opposite sides of the webs of the rails, one of said plates being sectional, and both of said plates being constructed to maintain the rails in surface and alinement, a filling-block arranged within the upright of the chair, a strap or band extending across the joint and opposing the upright of the angle-chair, and bolts for securing the parts of the joint together, for substantially the purposes set forth.

6. A rail-joint comprising an angle-chair having a base and an upright, rails of different weight and height supported in surface upon said chair, sectional angle-plates at one side of the webs of the rails, and a solid channel-plate at the other side of the webs of the rails between the rails and the upright of the angle-chair, said angle-plates and channel-plate being constructed to maintain the rails in surface and alinement, a filling-block arranged between the angle-plate and the upright of the chair, and bolts for securing the parts of the joint together, for substantially the purposes set forth.

7. A rail-joint, comprising an angle-chair having a base and an upright, rails of different weight and size supported in surface upon said chair, a solid channel-plate between the rails and the chair, a sectional angle-plate at the other side of the rails, a filling-block, a continuous strap along the sections of the angle-plate, and bolts for securing the parts of the joint together.

8. A rail-joint, comprising a suitable rail-support constructed to afford provision for supporting rails of different weight and height in surface, sectional bars at each side of the webs of the rails, said bars being constructed to maintain the rails in surface and alinement, a strap or band extending across the joint at one side and an opposing member extending across the joint at the other side, and bolts for securing the parts of the joint together, for substantially the purposes set forth.

9. A rail-joint, comprising a suitable rail-support constructed to afford provision for supporting rails of different weight and height in surface and alinement, bars at each side of the webs of the rails, one of said bars being sectional, and bolts for securing the parts of the joint together, for substantially the purposes set forth.

10. A rail-joint, comprising a suitable rail-support constructed to afford provision for supporting rails of different weight and height in surface, bars at each side of the webs of the rails, one of the bars being sectional, a filling-block at one side of the joint, and a strap or band extending at the other side of the joint along the sectional bars, and bolts for securing the parts of the joint together, for substantially the purposes set forth.

In testimony whereof I have signed this specification in the presence of two suscribing witnesses.

GEORGE A. WEBER.

Witnesses:
A. L. O'BRIEN,
E. VAN ZANDT.